US008118537B2

(12) United States Patent
Tutt

(10) Patent No.: US 8,118,537 B2
(45) Date of Patent: Feb. 21, 2012

(54) VERTICAL AXIS WINDMILL

(76) Inventor: Nicholas Tutt, Lumberton, TX (US)

( * ) Notice: Subject to any disclaimer, the term of this patent is extended or adjusted under 35 U.S.C. 154(b) by 0 days.

(21) Appl. No.: 12/661,696

(22) Filed: Mar. 23, 2010

(65) Prior Publication Data
US 2010/0254798 A1 Oct. 7, 2010

Related U.S. Application Data

(60) Provisional application No. 61/210,728, filed on Mar. 23, 2009.

(51) Int. Cl.
F03D 7/06 (2006.01)
(52) U.S. Cl. ............. 415/4.2; 415/4.4; 415/907; 416/10
(58) Field of Classification Search .................... 415/2.1, 415/4.1, 4.2, 4.4, 907; 416/9, 10, 17, 41, 416/117, 118; 290/44, 55
See application file for complete search history.

(56) References Cited

U.S. PATENT DOCUMENTS

| 14,997 | A | * | 6/1856 | Battey | 415/4.2 |
| 1,460,114 | A | * | 6/1923 | Shelton | 415/4.2 |
| 1,677,745 | A | * | 7/1928 | Bonetto | 415/232 |
| 1,810,113 | A | * | 6/1931 | Schlotzhauer | 415/2.1 |
| 4,474,529 | A | * | 10/1984 | Kinsey | 415/4.2 |

FOREIGN PATENT DOCUMENTS
DE 3631709 A1 * 3/1988
* cited by examiner

Primary Examiner — Edward Look
Assistant Examiner — Ryan Ellis
(74) Attorney, Agent, or Firm — Dennis L. Kreps

(57) ABSTRACT

An upstanding bladed rotor is journalled from support structure and a windshield assembly is also journalled from the support structure for angular displacement about an upstanding axis about the rotor. The windshield assembly includes a wind-shielding portion which extends generally about one half the periphery of the rotor and further includes a wind vane operative to maintain the assembly in predetermined position relative to wind incident upon the rotor with the wind-shielding portion in position to shield generally one lateral half of the rotor from the incident wind. The windshield assembly additionally includes a combined wind booster and excess wind controlling vane supported therefrom and disposed outward of the other lateral half of the rotor into the sweep area thereof responsive to high velocity wind incident thereon so as to apply rotary torque to the windshield assembly partially overcoming the directional control thereon by the wind vane and swinging the wind-shielding portion into position across the side of the rotor upon which the wind is incident so as to reduce the amount of high velocity wind available to drive the rotor and thus prevent the latter from overspeeding.

2 Claims, 7 Drawing Sheets

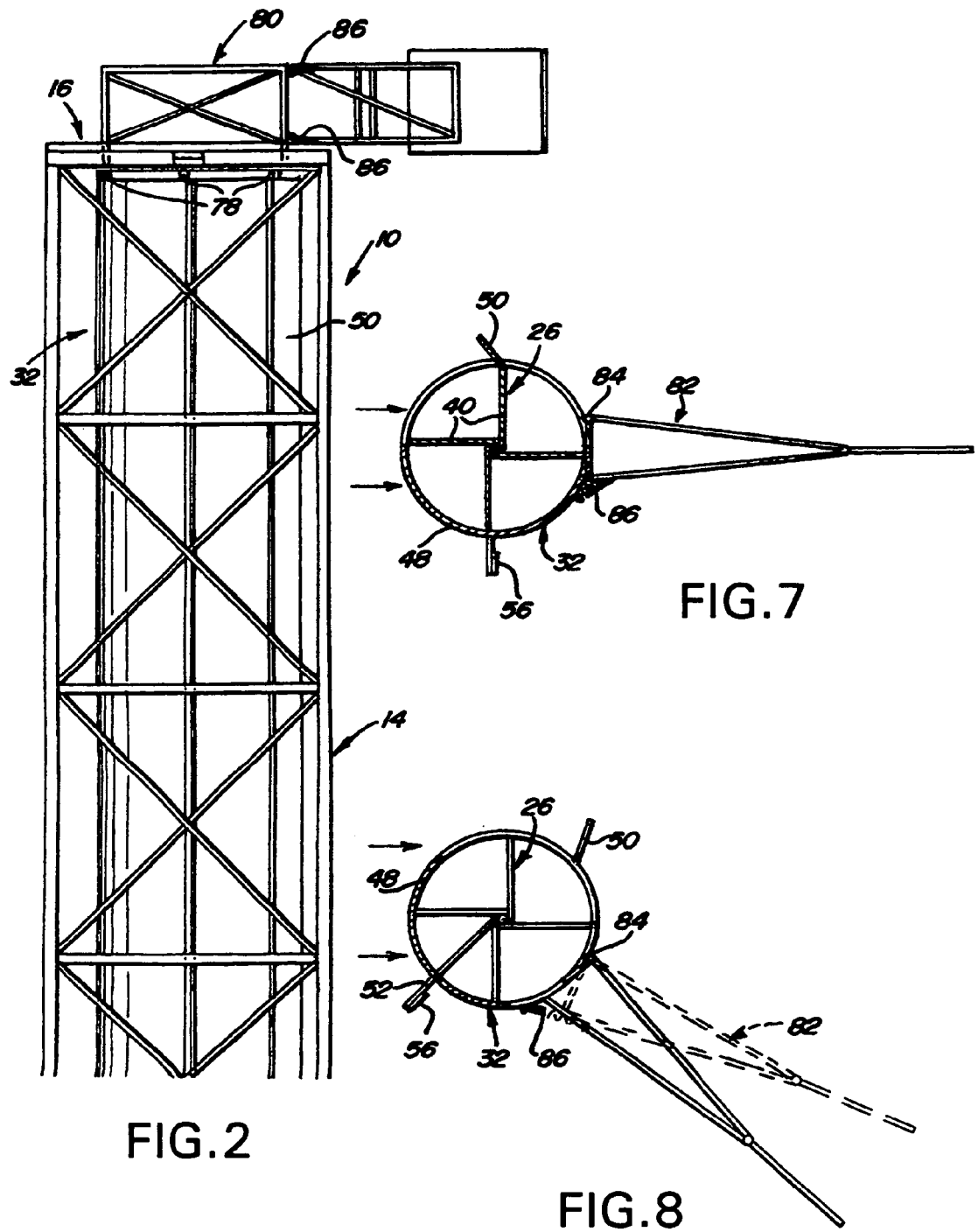

VERTICAL AXIS WINDMILL

CROSS REFERENCE TO RELATED APPLICATIONS

This application claims benefit of U.S. Provisional Patent Application Ser. No. 61/210,728, filed on Mar. 23, 2009.

BACKGROUND OF THE INVENTION

Various different forms of vertical windmills heretofore have been designed and provided with wind-shielding structure and other features such as those included on the windmill of the instant invention. Examples of these previously known forms of vertical axis windmills are disclosed in U.S. Pat. Nos. 204,404, 1,096,057, 1,640,296, 1,687,181, 1,974,008, 4,031,405, 4,134,707, 4,237,384, 4,245,958 and 4,278,896.

However, most of these previously known forms of vertical axis windmills include complex controls for wind-shielding portions thereof which do not perform the dual function of wind-shielding at high wind velocities as well as wind flow concentrating at lower wind velocities.

Accordingly, a need exists for a simplified vertical axis windmill with automatic wind-shielding structure to prevent rotor overspeeding at high wind velocities and wherein the wind-shielding structure additionally includes wind concentrating means automatically operable at low wind velocities to deflect additional wind into the sweep area of the rotor of the windmill.

BRIEF DESCRIPTION OF THE INVENTION

The vertical axis windmill of the instant invention includes a windshield assembly incorporating an arcuate semi-cylindrical windshield portion mounted for angular displacement about the axis of the associated vertical rotor and further incorporating wind vane structure whereby the windshield portion, at low wind velocities, may be automatically positioned to shield one side of the rotor having wind incident thereon and to uncover the other side of the rotor for reaction as a result of wind incident thereon. The windshield assembly also includes a wind booster or concentrating vane mounted for angular displacement with the windshield portion about the axis of rotation of the rotor with the booster vane positioned outwardly of the uncovered side of the rotor and operative to laterally deflect wind incident upon the booster vane into the sweep area of the rotor during low wind velocity conditions. In addition, the booster vane is also operative to impart rotary torque to the windshield portion under high velocity wind conditions in order to swing the windshield portion from a position shielding only one lateral side of the rotor toward a position shielding almost the entire front side of the rotor from wind incident thereon and to thereby prevent overspeeding of the rotor.

The windshield assembly also includes a manual control therefor whereby angular displacement of the windshield portion to a full rotor-shielding position may be effected independent of high wind velocities.

The main object of this invention is to provide a vertical axis windmill including a windshield assembly therefor operative to maintain one side of the windmill shielded against low and moderate velocity winds and shiftable into position in response to high velocity winds for shielding at least substantially the entire side of the windmill upon which the high velocity wind is incident and thereby automatically protect the windmill rotor against overspeeding.

Another important object of this invention is to provide a vertical axis windmill including a remotely operable motor-driven means for swinging the windshield portion thereof into substantially total rotor-shielding position.

Another object of the invention is the addition of a relatively large ring gear to the lower end of the windmill shaft, allowing multiple generators to be driven through multiple spur gears mounted to their input shafts, with the spur gears evenly spaced around the periphery of the large ring gear.

Still another object of the invention in a different embodiment is the elimination of guy wires to support the windmill frame in a vertical position by widening the support frame at the bottom, creating a cone-shaped support for the rotor, windshield and wind vane members.

A final object of this invention to be specifically enumerated herein is to provide a vertical axis windmill in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a side elevational view of the windmill.

FIG. 7 is a schematic view illustrating the rotor and windshield assembly in their relative operative positions during light and moderate winds.

FIG. 8 is a top plan schematic view illustrating the rotor and windshield assembly in their relative positions during high velocity wind conditions.

DETAILED DESCRIPTION OF THE INVENTION

Figure 1:
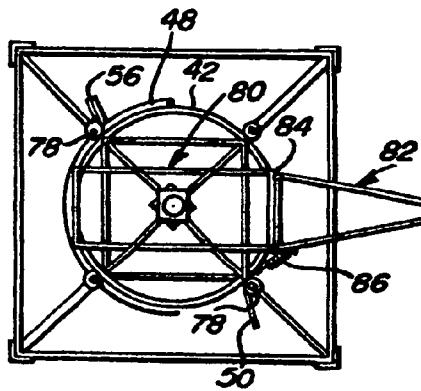
FIG. 1 is a top plan view of the windmill of the instant invention.
Figure 9:
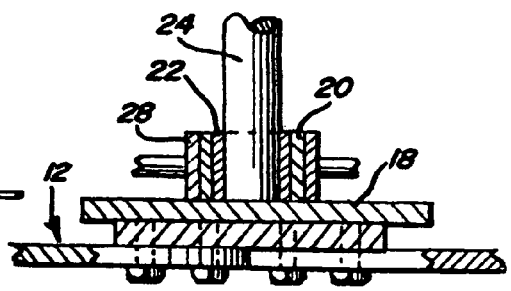
FIG. 9 is an enlarged fragmentary vertical sectional view illustrating the lower bearing assembly of the rotor.
Figure 5:
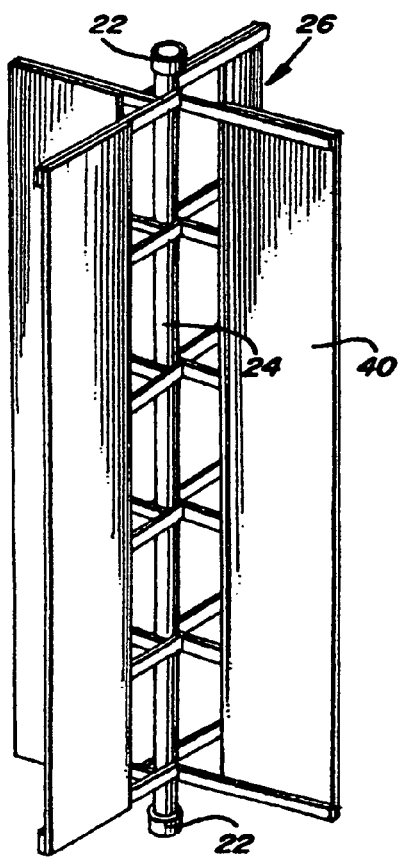
FIG. 5 is a perspective view of the windmill rotor.

Referring now more specifically to the drawings the numeral 10 generally designates the vertical axis windmill of the instant invention. The windmill 10 includes a lower base frame assembly referred to in general by the reference numeral 12 and an upright tubular or angle iron support framework referred to in general by the reference numeral 14 supported from the base frame assembly 12. In addition, the upper end of the framework 14 supports an upper frame assembly referred to in general by the reference numeral 16.

The base frame assembly 12 includes a central portion 18 from which an upstanding cylindrical bearing journal 20 is supported. A sleeve bearing 22 carried by the lower end of the central shaft 24 of a rotor assembly referred to in general by the reference numeral 26 is journalled by the sleeve bearing 22 from the bearing journal 20 and the bearing journal 20 also rotatably journals a cylindrical hub 28 supported by radial arms 30 from the lower end of a windshield assembly referred to in general by the reference numeral 32. The upper frame assembly 16 similarly rotatably journals the upper end of the shaft 24 and an upper hub 36 supported from the upper end of the windshield assembly 32 by radial arms 38.

The rotor assembly 26 includes four generally radially projecting blades 40 substantially paralleling the shaft 24 and the windshield assembly 32 includes upper and lower end rings 42 and 44 as well as an intermediate height ring 46. The outer ends of the arms 30 are anchored relative to equally circumferentially spaced portions of the ring 44 and the outer ends of the arm 38 are anchored relative to corresponding equally circumferentially spaced portions of the ring 42. In addition, the windshield assembly 32 includes a substantially semi-cylindrical wind-shielding portion 48 extending the full length thereof and secured to the rings 42, 44 and 46 and the peripheral portions of the rings 42, 44 and 46 toward which the wind-shielding portion 48 opens support an elongated wind booster and windshield positioning panel 50. Also, the upper and lower rings 42 and 44 mount generally radially outwardly projecting and longitudinally slotted support arms 52 and 54 from which a balance vane 56 opposite the panel 50 is supported. The upper and lower ends of the vane 56 are mounted to the arms 52 and 54 by fasteners 58 passed through slots in the arms 52 and 54. Accordingly, the radial spacing of the balance vane 56 from the center axis of the shaft 24 may be adjusted.

The base frame assembly 12 includes a circular track 60 upon which depending support wheels 62 supported from the lower ring 44 are rollingly engaged. In this manner, the hubs 28 function merely as radial thrust bearings and need not also function as axial thrust bearings. In addition, the lower end of the ring 44 includes a circumferentially extending rack gear 64 with which a spur gear 66 mounted on the output shaft of a reversibly controllable electric motor 68 is meshed. The motor 68 is stationarily supported from the base frame assembly 12 in any convenient manner. It will be noted that the base frame assembly 12 includes radial bracing members 70 for the track 60 as well as substantially tangential bracing members 72.

The upper portion of the windshield assembly ring 42 defines a circular track with which wheels 78 journalled from the upper end of the assembly 12 are rollingly engaged. Further, the upper end of the windshield assembly 32 includes an upwardly projecting frame assembly referred to in general by the reference numeral 80 and one side portion of the base end of a wind vane 82 is pivotally mounted from the frame 80 as at 84 for angular displacement about an upstanding axis and the other side of the base end of the wind vane 82 abuts the frame assembly 80 and is biased there toward by expansion springs 86.

Either the upper or lower end of the shaft 24 may be drivingly connected to any suitable load such as a pump, electrical generator or other mechanical equipment for operating the same. During low and moderate wind operating conditions the wind vane 82, responsive to the wind direction, will rotate the windshield assembly 32 to a position such as that illustrated in FIG. 7 of the drawings with the windshield portion or panel 48 shielding the right side of the rotor assembly 26, as the windmill 10 is viewed from an upwind position, and the left side of the rotor assembly 26 will be exposed to the wind resulting in clockwise rotation of the rotor assembly 26 as viewed in FIG. 7. The panel 50 laterally deflects that portion of the wind which would pass immediately outward of the left side of the rotor assembly 26 into the sweep area of the blades 40 of the rotor assembly 26 and thus increases the driving force of the wind on the blades 40. It will be noted that the panel 50 is inclined relative to a position disposed at right angles to the wind direction so that the free outer edge of the panel 50 is inclined in an upwind direction. Thus, the panel 50 is efficient in catching the wind incident thereon and deflecting the same into the sweep area of the blades 40.

As the wind velocity increases, with attention invited now more specifically in FIG. 8, the wind incident upon the panel 50 tends to rotate the windshield assembly 32 from the position thereof in FIG. 7 effected by the wind vane 82 and the lateral wind forces on the angularly displaced wind vane 82 causes the latter to pivot against the biasing action of the springs 86 from the solid line position thereof illustrated in FIG. 8 to the phantom line position thereof. This causes the wind-shielding panel 48 to at least partially block the left hand side of the rotor assembly 26 and the biasing action of the wind incident upon the panel 50 to rotate the windshield assembly 32 to the position thereof illustrated in FIG. 8 is modulated, to at least some extent, by the balance vane 56.

In extremely high velocity winds the rotational torque developed upon the windshield assembly 32 by the panel 50 is sufficient to swing the windshield assembly 32 to a position with the wind-shielding panel 48 substantially fully blocking that side of the windmill 10 facing directly into the wind and the wind vane 82 is further angularly displaced relative to the windshield assembly 32 in a counterclockwise direction from the phantom line position thereof illustrated in FIG. 8. This of course will effectively prevent the wind from developing any appreciable torque on the rotor assembly 26.

Figure 6:
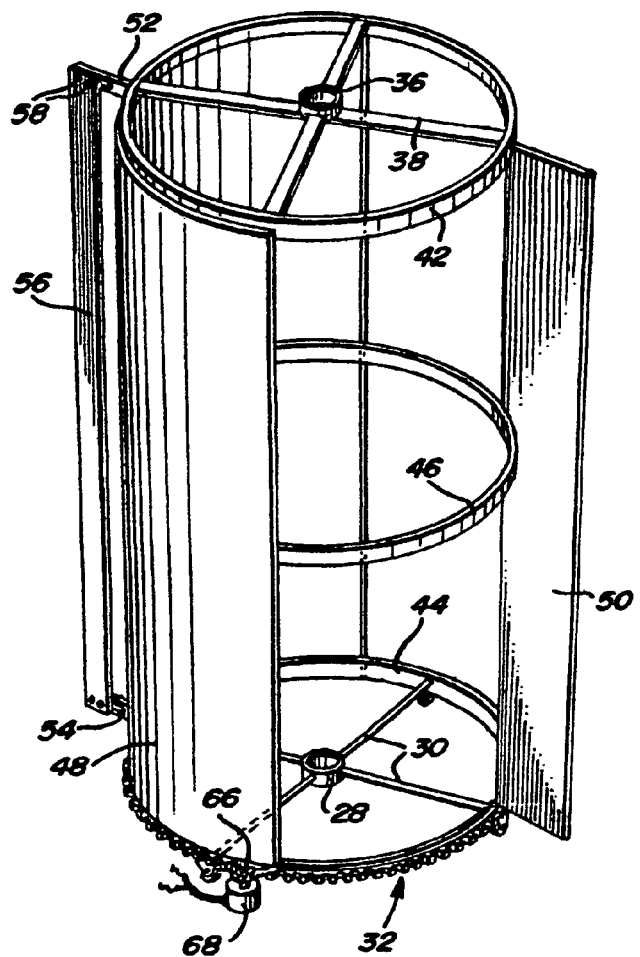
FIG. 6 is a perspective view of the windmill windshield assembly including the windshield control and wind booster panel as well as the balancer vane thereof.
Figure 3:
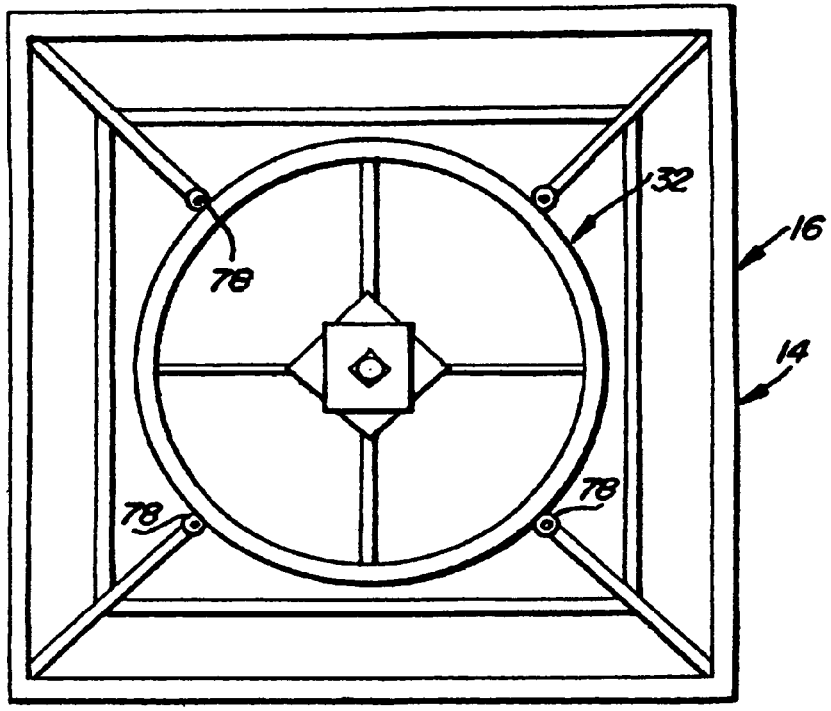
FIG. 3 is a top plan view of the upper frame portion of the windmill support.
Figure 10:
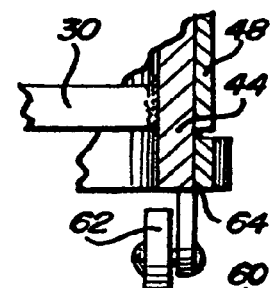
FIG. 10 is a fragmentary enlarged vertical sectional view illustrating the base support track and one of the windshield assembly mounted rollers by which axial downward gravity forces acting upon the windshield assembly are opposed.
Figure 4:
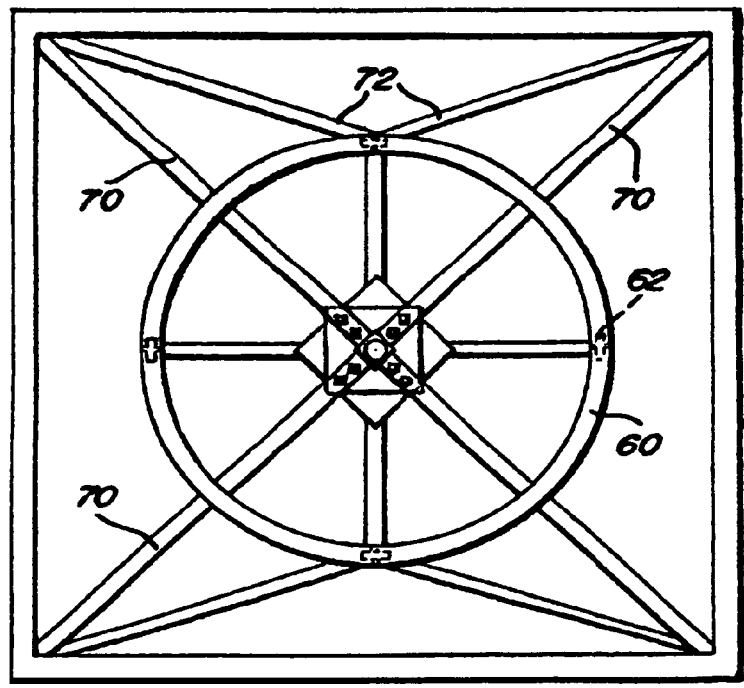
FIG. 4 is a top plan view of the lower windmill support.
Figure 14:
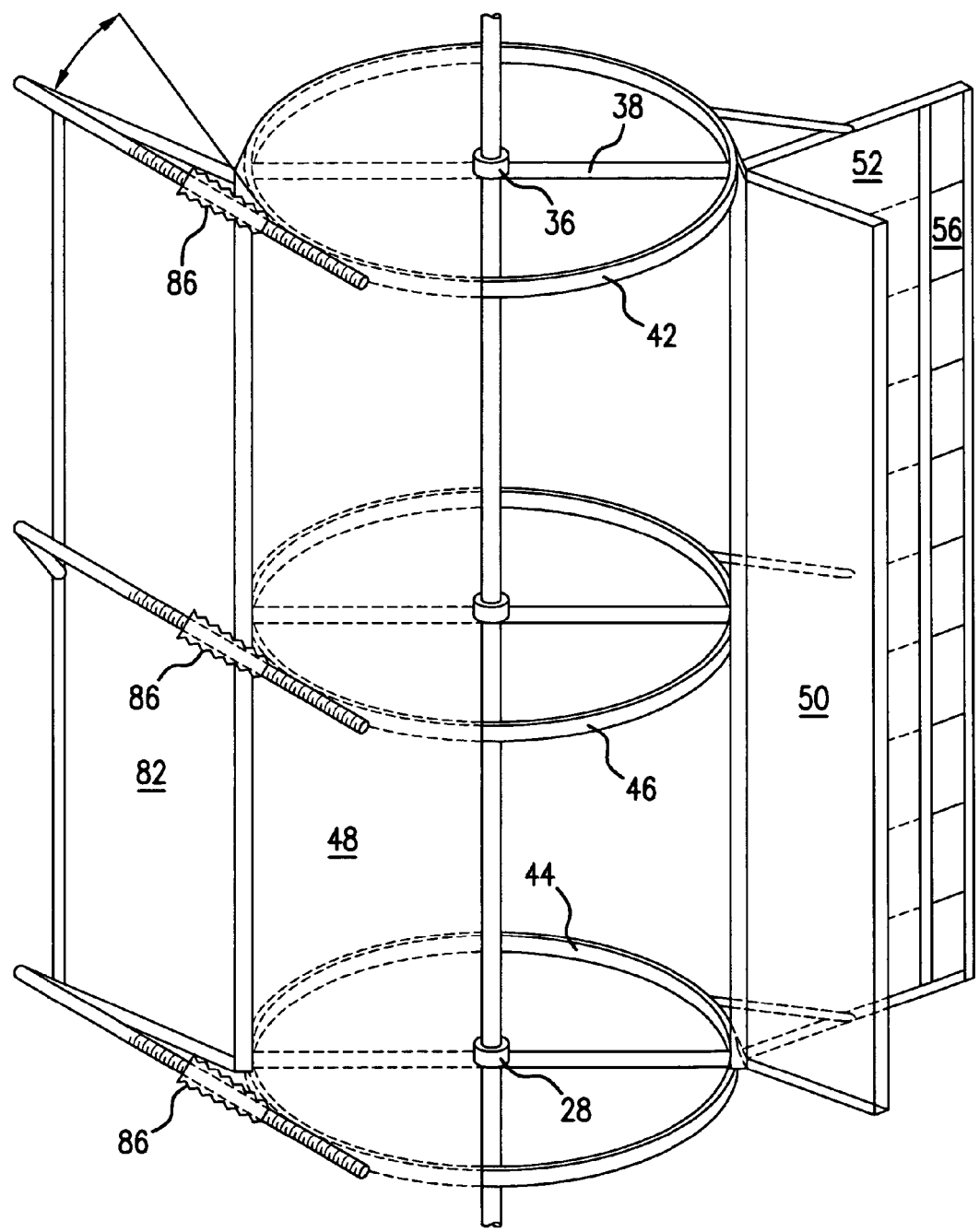
FIG. 14 is yet another perspective view of the windmill windshield assembly including the windshield control and wind booster panel as well as the balancer vane thereof.

FIG. 14 is another view of the complete windshield assembly, and is provided to enhance one's understanding of the operation of the windshield assembly as previously described with reference to FIGS. 6, 7 and 8.

If for any reason it is desired to shut down the windmill 10, the motor 68 may be remotely actuated in order to angularly displace the windshield assembly 32 to a position with the wind-shielding panel 48 totally blocking the side of the windmill 10 facing directly into the wind. The motor 68 may include a worm gear drive for the gear 66 and a solenoid-actuated mechanism for axially shifting the gear 66 into and out of engagement with the rack gear 64. In this manner, the motor 68 may be actuated to engage the gear wheel 66 with the rack gear 64 and to turn the windshield assembly 32 to the desired position after which operation of the motor may be terminated and the meshed engagement of the gear 66 with the rack gear 64 may be relied upon to prevent angular displacement of the windshield assembly 32 from the adjusted position thereof.

Figure 11:
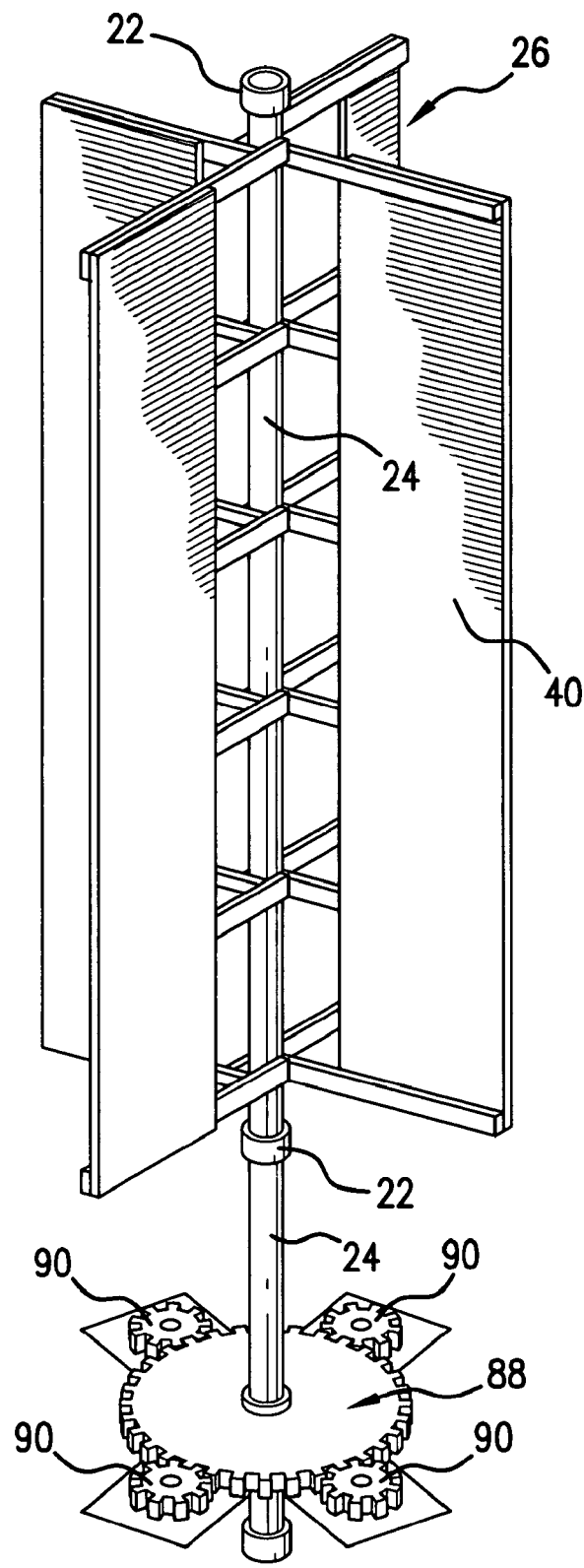
FIG. 11 is a perspective view of the windmill rotor and shaft assembly including an enlarged ring gear for driving multiple generators.
Figure 12:
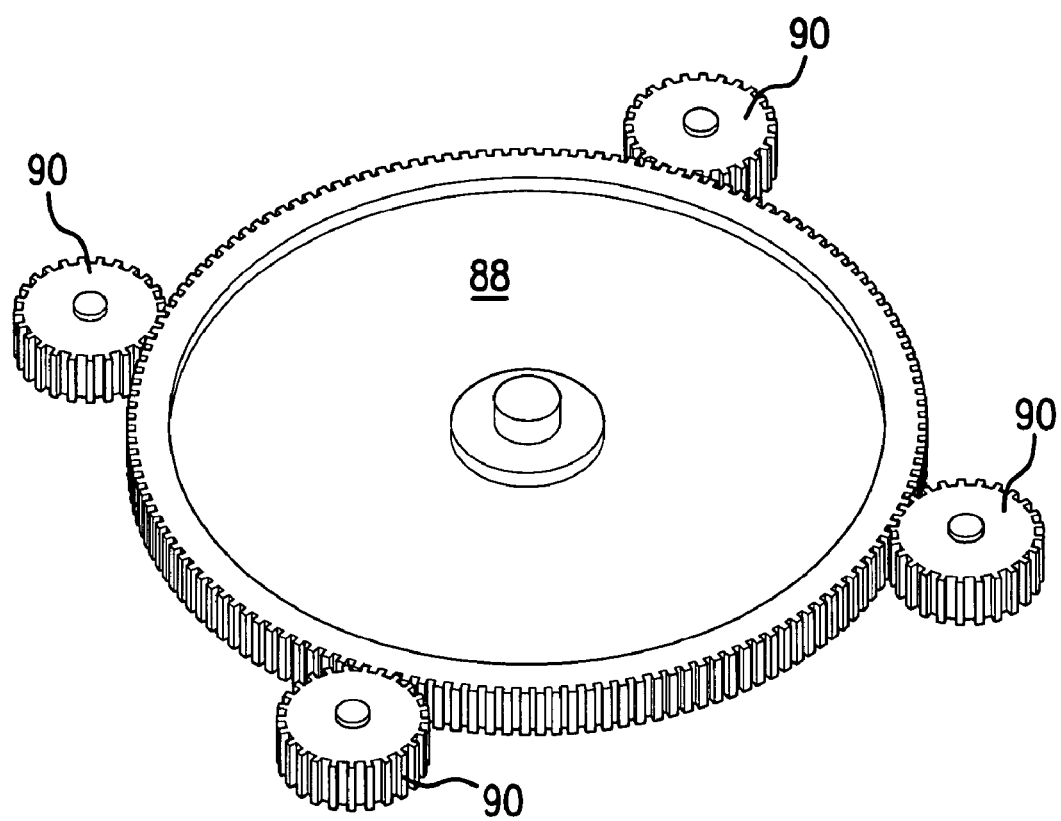
FIG. 12 is a perspective view showing more detail of the ring and spur gears.

A modification of the invention for improved electrical efficiency is shown in FIG. 11, in which shaft 24 is extended and secured to a relatively large ring gear 88, which allows multiple generators to be connected to a single ring gear through spur gears 90. FIG. 12 shows the ring and spur gears in greater detail.

Figure 13:
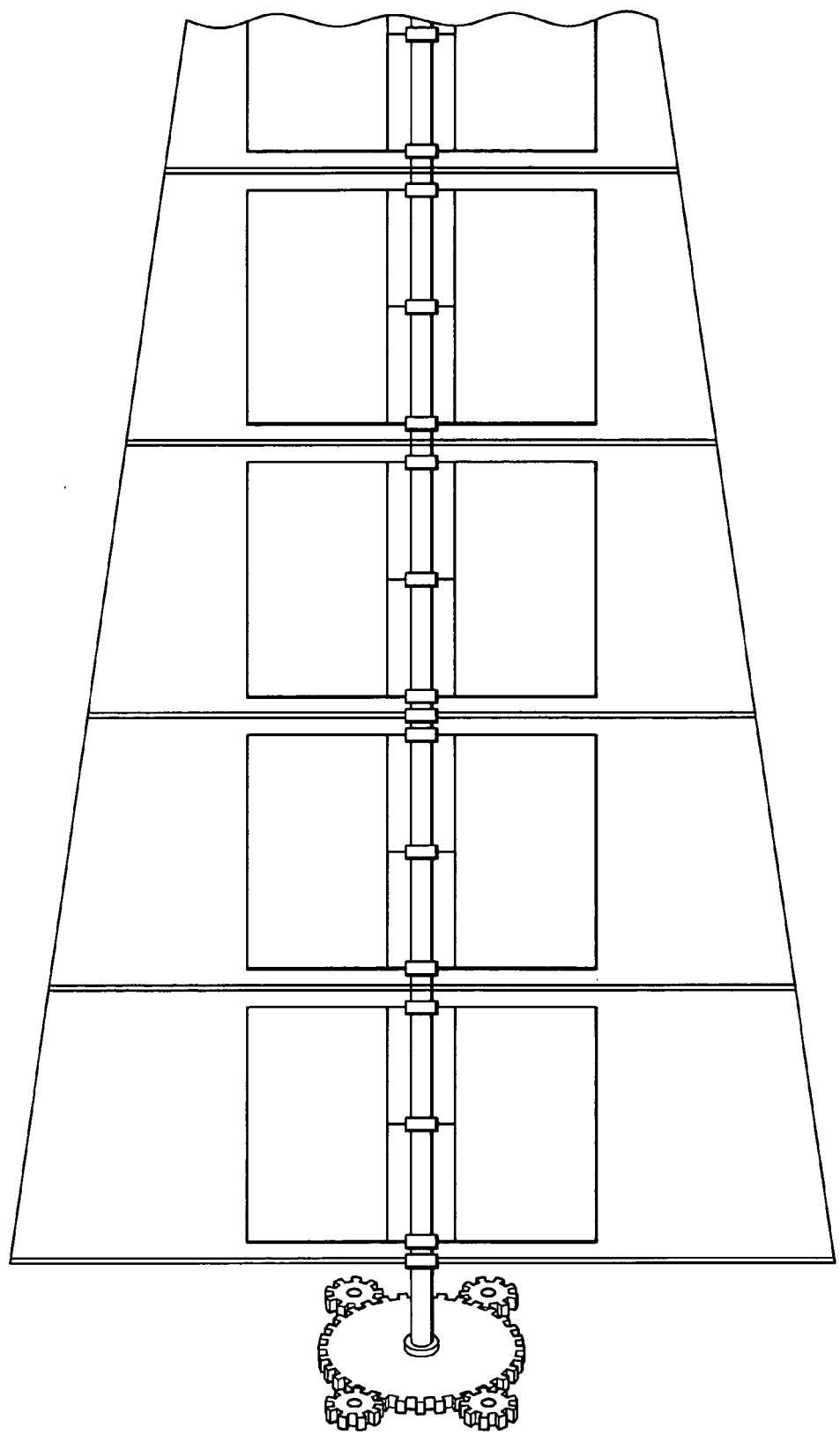
FIG. 13 is a side plan view of the windmill support structure illustrating the more stable shape of a cone or truncated pyramid.

Another modification within the scope of the invention is illustrated in FIG. 13, in which guy wire supports for the vertical windmill structure are eliminated by building the support frame in the shape of a cone or a truncated pyramid. By making the support frame wider at the bottom and narrower at the top, guy wires are no longer needed for sufficient structural rigidity.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vertical axis windmill including support means, an upstanding bladed rotor journalled from said support means for rotation about an upstanding axis, a windshield assembly freely journalled from said support means for angular displacement about said axis and including wind vane means supported therefrom operative to maintain said assembly in predetermined position relative to the direction of wind incident thereupon as well as a generally semi-cylindrical wind-shielding portion extending about and operative to shield generally one lateral half of said rotor and operative to laterally deflect wind incident thereupon into the sweep area of said rotor on the side thereof remote from said one diametric lateral half and further in opposition to the rotary torque developed by said wind vane means thereupon as said assembly is angularly displaced from said predetermined position relative to said wind, in a direction to swing said wind-shielding portion in the direction of rotation of said rotor, from its predetermined position shielding said one lateral half of said rotor toward a position shielding at least the forward portion of the other lateral half of said rotor, said windshield assembly also including a balancer vane extending along and disposed outward of said wind-shielding portion generally opposite said excess wind controlling vane means, said windshield assembly and balancer vane including means mounting said balancer vane from said windshield assembly for adjustable shifting relative thereto between positions enabling said balancer vane to develop more or less rotary torque on said windshield assembly responsive to wind incident on said balancer vane and windshield assembly, and wherein said windshield assembly includes upper and lower journal bearing means as well as lower roller means journalled for rotation about axes extending generally radially of the axis of angular displacement of said windshield assembly, said roller means being rollingly engaged with upwardly facing track means mounted from said support means, wherein said support means includes upper roller means supported therefrom for rotation about axes generally paralleling the axis of angular displacement of said windshield assembly and rollingly engaged with an upper annular portion of said windshield assembly.

2. A vertical axis windmill including support means, an upstanding bladed rotor journalled from said suport means for rotation about an upstanding axis, a windshield assembly freely journalled from said support means for angular displacement about said axis and including wind vane means supported therefrom operative to maintain said assembly in predetermined position relative to the direction of wind incident thereupon as well as a generally semi-cylindrical wind-shielding portion extending about and operative to shield generally one lateral half of said rotor and operative to laterally deflect wind incident thereupon into the sweep area of said rotor on the side thereof remote from said one diametric lateral half and further in opposition to the rotary torque developed by said wind vane means thereupon as said assembly is angularly displaced from said predetermined position relative to said wind, in a direction to swing said wind-shielding portion in the direction of rotation of said rotor, from its predetermined position shielding said one lateral half of said rotor toward a position shielding at least the forward portion of the other lateral half of said rotor, said windshield assembly also including a balancer vane extending along and disposed outward of said wind-shielding portion generally opposite said excess wind controlling vane means, said windshield assembly and balancer vane including means mounting said balancer vane from said windshield assembly for adjustable shifting relative thereto between positions enabling said balancer vane to develop more or less rotary torque on said windshield assembly responsive to wind incident on said balancer vane and windshield assembly, and wherein said windshield assembly includes upper and lower journal bearing means as well as lower roller means journalled for rotation about axes extending generally radially of the axis of angular displacement of said windshield assembly, said roller means being rollingly engaged with upwardly facing track means mounted from said support means, wherein said wind vane means includes an elongated wind vane having opposite base and free ends, said base end being of greater width than said free end, means mounting one side of said base end on said windshield assembly for oscillation of said wind vane relative to said windshield assembly about an axis generally paralleling the first mentioned axis, the other side of said base end and said windshield assembly including coacting abutment portions abuttingly engaged with each other, biasing means connected between said windshield assembly and said wind vane yieldingly resisting angular displacement of said wind vane relative to said windshield assembly in said direction of rotation of said rotor responsive to excess wind conditions acting upon said wind vane and also upon said excess wind controlling vane means.

* * * * *